Patented Feb. 4, 1930

1,745,753

UNITED STATES PATENT OFFICE

HANS HEINRICH FRANCK AND HUGO HEIMANN, OF BERLIN, GERMANY

PROCESS FOR THE PREPARATION OF METALLIC CYANAMIDES OR MIXTURES CONTAINING THEM

No Drawing. Application filed October 19, 1927, Serial No. 227,353, and in Germany October 23, 1926.

It has been found that when a mixture of ammonia and carbon monoxide acts on carbonates of divalent metals such as calcium, barium, zinc, magnesium, etc., at temperatures equal to, or slightly above or below the dissociation temperatures of these carbonates, at ordinary or increased pressure, the corresponding metallic cyanamides are obtained in good yield.

The realization of this reaction, viz, the conversion of carbonates into cyanamides, is closely related to the inversion of the process for the production of ammonia from metallic cyanamides, which, for example in the case of barium cyanamide proceeds as follows:

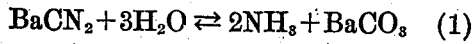

$$BaCN_2 + 3H_2O \rightleftarrows 2NH_3 + BaCO_3 \quad (1)$$

The preparation of the cyanamide salts of a few metals by this means has already been attempted according to statements in the literature, but the small yields obtained, the high temperatures required, which often caused decomposition of the ammonia and premature decomposition of the carbonate, and the unfavorable position of the equilibrium which tends to reverse the reaction, did not seem to promise much for the technical success of such a process.

Quite new reaction conditions are introduced when a mixture of ammonia and carbon monoxide is employed. The presence of carbon monoxide affects the splitting off of water (see Equation 1 from right to left) in such a way that the formation of cyanamide is promoted. Water is continually removed from the system represented in Equation (1) according to the equation:

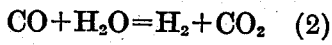

$$CO + H_2O = H_2 + CO_2 \quad (2)$$

so that Equation (1) can proceed completely towards the left. The carbon dioxide simultaneously formed according to Equation (2) has also a favorable effect on the carbonate dissociation since, by recarbonating calcium oxide produced it prolongs or increases the nitrogen-fixing capacity of the starting material. Proof that this explanation of the reaction is correct is supplied by the fact that the residual gas from the process always contains hydrogen with a total nitrogen yield in combined (cyanamide) and recovered from (ammonia) of about 99 to 100%.

The following examples will make the process clear:

(1) 1 kg. calcium carbonate is treated in an electric tube oven with a mixture of ammonia and carbon monoxide (10:2) at 750°. The end product contains 92% calcium cyanamide together with the balance of the calcium as carbonate and some oxide.

(2) 50 g. magnesium carbonate are treated as in Example 1, the gas mixture having the composition 6:4. At the end of the experiment, 26% of the nitrogen has been fixed as cyanamide.

The favorable accelerating effect of carbon monoxide can be increased by addition to the metallic carbonates of fluxes as for example: alkali carbonates, calcium fluoride, oxides etc. It is also evident that the process is not restricted to the homogenous metallic carbonates, but that natural and artificial mixtures of several carbonates, e. g., dolomite or barium carbonate plus calcium carbonate mixtures may also be used.

In order that high efficiencies may be obtained, it has been found essential that metals or metal compounds, such as iron or nickel which promote the decomposition of ammonia, should be absent. Apparatus of ceramic materials, particularly quartz are therefore suitable for the reaction. Volatile iron compounds, e. g., iron carbonyl, must be excluded from the gases used especially where the process requires a high temperature.

What we claim is:

1. The process for the preparation of metallic cyanamides which comprises treating the carbonates of divalent metals with a mixture of ammonia and carbon monoxide at temperatures near the dissociation temperatures of the carbonates.

2. The process of claim 1 in which the reaction is carried out at pressures above atmospheric.

3. The process of claim 1 in which the reaction is carried out in the presence of a promoting agent.

4. The process of claim 1 in which the reaction is carried out in the absence of substances which promote decomposition of ammonia.

5. A process for the preparation of an alkali earth metal cyanamide which comprises treating the carbonate of an alkali earth metal with a mixture of ammonia and carbon monoxide at a temperature approximating the dissociation temperature of the carbonate.

6. A process for the preparation of calcium cyanamide which comprises treating calcium carbonate with a mixture of ammonia and carbon monoxide at a temperature of about 750° C.

7. The process of claim 1 in which the reaction is carried out in the presence of a promoting agent comprising a compound of a metal of the first or second group of the periodic system.

In testimony whereof, we have hereunto subscribed our names this 4th day of October, 1927.

HANS HEINRICH FRANCK.
HUGO HEIMANN.